United States Patent [19]

Fannin

[11] 4,003,605
[45] Jan. 18, 1977

[54] FLUID PRESSURE BRAKING SYSTEM WITH LIMITING VALVE FOR ANTI-COMPOUNDING AND FAIL-SAFE STANDBY VALVE

[75] Inventor: Richard C. Fannin, Elyria, Ohio

[73] Assignee: The Bendix Corporation, South Bend, Ind.

[22] Filed: Nov. 28, 1975

[21] Appl. No.: 636,384

[52] U.S. Cl. .................................. 303/6 M; 303/9; 303/13; 303/71
[51] Int. Cl.² ........................................ B60T 13/22
[58] Field of Search ............ 303/6, 7, 9, 13, 28–30, 303/71, 50, 63, 52; 188/170; 137/102

[56] References Cited
UNITED STATES PATENTS

| | | | |
|---|---|---|---|
| 2,406,284 | 8/1946 | Fitch | 137/102 X |
| 3,294,455 | 12/1966 | Valentine | 303/13 X |
| 3,443,839 | 5/1969 | Hinrichs et al. | 303/13 X |
| 3,456,988 | 7/1969 | Gibbons et al. | 303/13 X |

Primary Examiner—Trygve M. Blix
Assistant Examiner—Douglas C. Butler
Attorney, Agent, or Firm—Ken C. Decker; William N. Antonis

[57] ABSTRACT

A fluid pressure braking system for a vehicle having brake actuators which may be mechanically held in the brake-applied position when the vehicle is parked and which may be actuated from either service or emergency actuating systems, is provided with a fluid communication limiting valve which limits fluid communication through the service actuating system to the brake actuators when the actuators have been actuated by the emergency system, thereby providing an "anticompounding" capability so that the brake actuators cannot be actuated by the combined full capacities of both actuating systems. The system further includes a standby valve which is responsive to a normal brake application to communicate fluid pressure to the actuators through the emergency system when the failure of the primary fluid pressure system prevents communication to the actuators through the service system.

11 Claims, 2 Drawing Figures

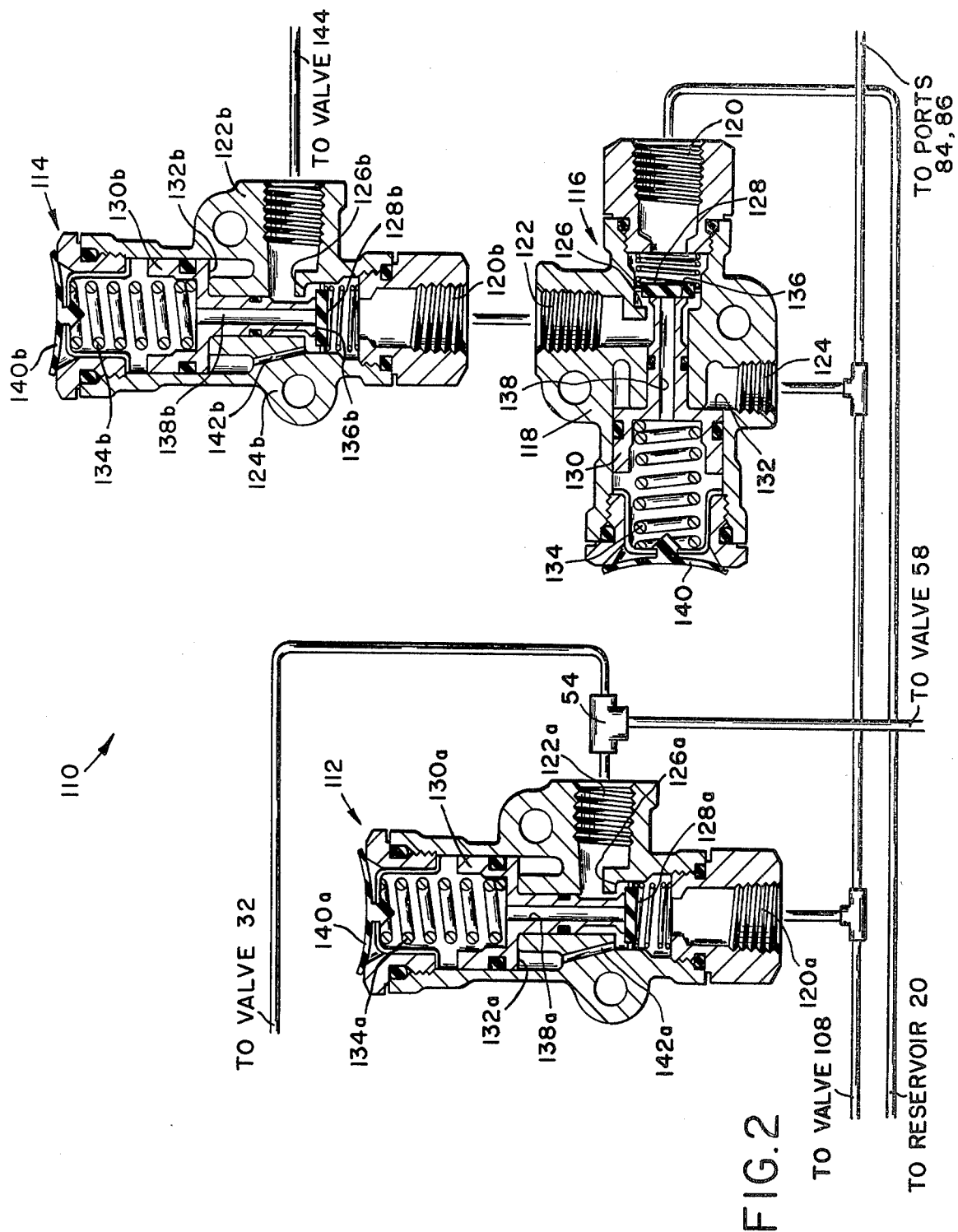

FLUID PRESSURE BRAKING SYSTEM WITH LIMITING VALVE FOR ANTI-COMPOUNDING AND FAIL-SAFE STANDBY VALVE

SUMMARY OF THE INVENTION

This invention relates to a fluid pressure service and an emergency-parking brake system for a vehicle.

An important object of my invention is to provide an "anti-compounding" capability for a fluid pressure actuator of a type which may be actuated by both the normal service braking system and by the emergency-parking system. This anti-compounding capability is provided to prevent the brake actuator from being actuated by the combined full capabilities of both systems during a parking application which may have the effect of damaging the braking mechanism or of preventing release of the parking application.

Another important object of my invention is to provide standby capability in a fluid pressure braking system which includes a brake actuator which may be actuated through either of a service actuating system or an emergency-parking system, wherein the standby system, upon failure of the service braking system, automatically communicates a modulated air supply to the actuator through the emergency-parking system when a normal service brake application is effected.

Still another important object of my invention is to provide valving which automatically communicates the predetermined pressure level to the service port of a brake actuator when the parking mechanism thereof is to be released, to thereby eliminate the necessity of the vehicle operator to independently actuate the service braking system to release the parking brake.

DESCRIPTION OF THE DRAWINGS

FIG. 2 is a detailed schematic illustration of a portion of the braking system illustrated in FIG. 1, which illustrates some of the valves used therein in cross section.

DETAILED DESCRIPTION

Figure 1:
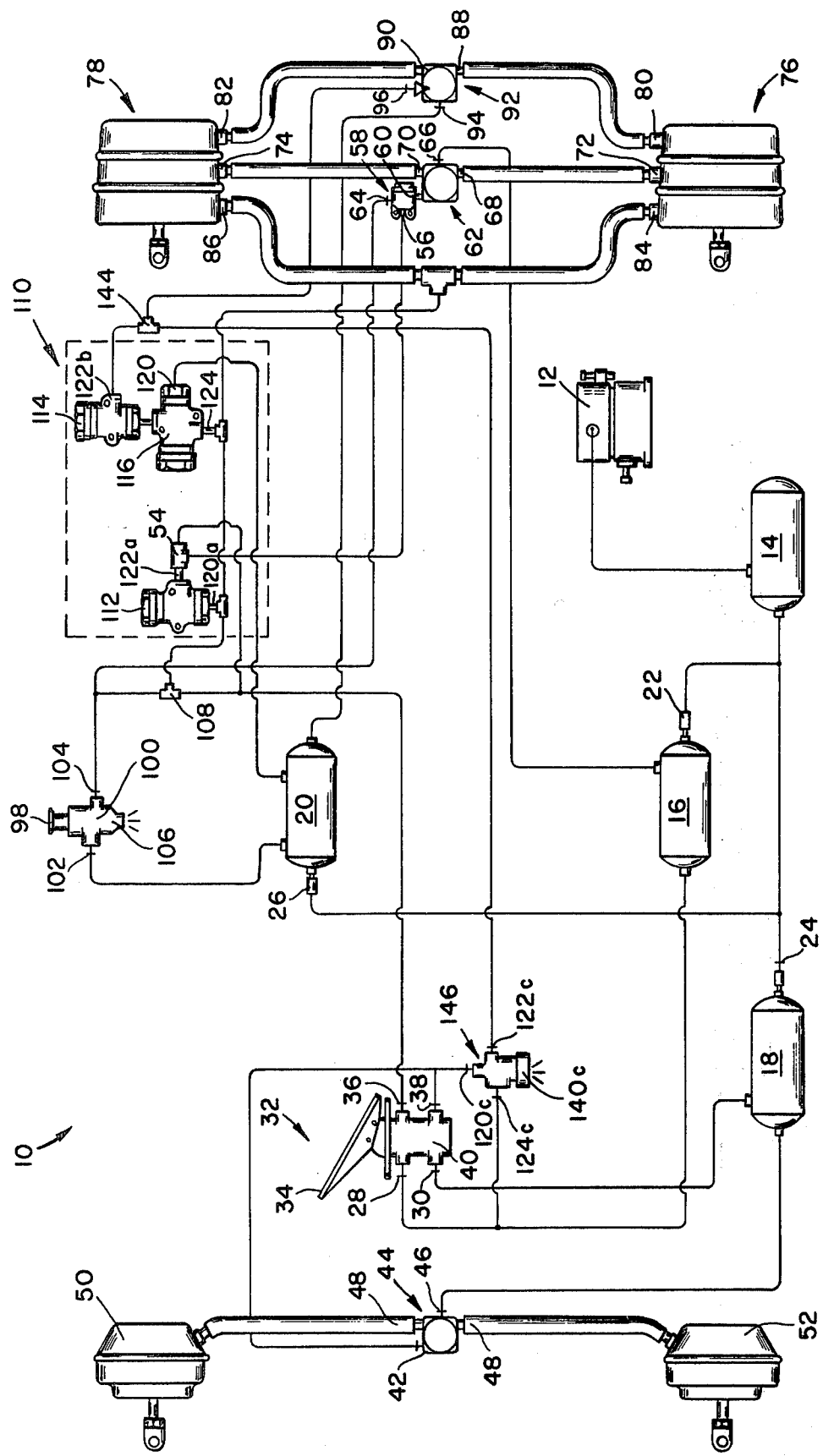
FIG. 1 is a schematic illustration of a vehicle braking system made pursuant to the teachings of my present invention.

Referring now to the drawings, a vehicle fluid pressure braking system generally indicated by the numeral 10 includes a conventional air compressor 12 which is powered by the vehicle engine and which compresses atmospheric air to charge a supply reservior generally indicated by the numeral 14. The supply reservoir 14 charges a primary service reservoir 16, a secondary service reservoir 18, and a parking-emergency reservoir 20. Each of the reservoirs 16, 18, and 20 are protected by one-way check valves 22, 24, and 26 which permit fluid communication from the reservoir 14 into the corresponding reservoir 16, and 18, and 20, but which prevent escape of air therefrom in the reverse direction. The fluid pressure content of the reservoirs 16 and 18 is communicated to corresponding inlet ports 28 and 30, respectively, of a conventional dual brake valve generally indicated by the numeral 32. The dual valve 32 is constructed in accordance with the teachings of U.S. Pat. No. 3,266,850, owned by the assignee of the present invention and incorporated herein by reference. When a brake application is effected by operation of the treadle 34 by the vehicle operator, the inlet ports 28 and 30 are communicated to their corresponding delivery ports 36, 38, respectively. When the treadle 34 is released, the delivery ports 36, 38 are vented to atmosphere through an exhaust port. The outlet port is communicated to the control port 42 of a conventional relay valve herein indicated by the numeral 44. The relay valve 44 may be of any conventional design well known to those skilled in the art and is provided with a supply port 46 which is communicated to the service reservoir 18 and delivery ports 48 which are communicated to the front wheel brake actuators 50, 52. The relay valve 44 communicates a predetermined pressure level from the secondary reservoir 18 to the actuators 50 corresponding to the pressure level communicated to the control port 42 of the relay valve 44 by the brake valve 32. Since the pressure communicated to the actuators 50, 52 correspond to the pressure communicated to the control port 42 by the brake valve 32, a modulated brake application is effected. The actuators 50 and 52 may also be made from any conventional design well known to those skilled in the art.

The outlet port 36 of the dual brake valve 32 is communicated through a double check valve 54 to the supply port 56 of a limiting valve generally indicated by the numeral 58. The limiting valve 58 is provided with a delivery port 60 which is connected directly to the control port of a standard relay valve 62, which is identical to the relay valve 44. The limiting valve 58 further includes a control port 64 which is connected to a fluid pressure source as will be described hereinafter. The limiting valve 58 is made pursuant to the teachings of U.S. Pat. No. 2,406,284, owned by the assignee of the present invention and incorporated herein by reference. The limiting valve 58 is adapted to permit substantially uninhibited fluid communication between the supply port 56 and the delivery port 60 thereof when the pressure level at the control port 64 exceeds a predetermined level. However, when the pressure at the control port 64 drops below the predetermined level, the limiting valve 58 communicates only a predetermined percentage of the pressure level at the supply port 56 to the delivery port 60. In the case of the limiting valve 58, the pressure level at the delivery port 60 will be approximately one-half of the pressure level at the supply port 56 when the control port 64 is vented. The supply port 66 of the relay valve 62 is communicated with the primary service reservoir 16, and delivery ports 68, 70 of the latter are communicated to serve corresponding service ports 72, 74 of service and parking actuators generally indicated by the numerals 76 and 78. Actuators 76, 78 are made pursuant to the teachings of U.S. Pat. No. 3,228,729, owned by the assignee of the present invention and incorporated herein by reference. Actuators 76 and 78, in addition to their service ports 72, 74 are also provided with emergency-parking ports 80, 82 and lock ports 84, 86. The actuators 76 and 78 are adapted to effect a brake application when fluid pressure is communicated to either the service ports 72, 74 or the emergency-parking ports 80, 82. If fluid pressure is also communicated to the lock ports 84, 86, the brake actuators are released in the normal manner when the fluid pressure level at the service ports 72, 74 or at the emergency-parking ports 80, 82 is exhausted. However, if the pressure at the lock ports 84, 86 is exhausted while a brake application is effected, the brake application will be "locked on" thereby providing a parking brake capability.

The ports 80, 82 are communicated to corresponding delivery ports 88, 90 of a relay valve 92 which may be made similar to the relay valves 44 and 62. The supply port 94 of the relay valve 92 is communicated to the parking-emergency reservoir 20. The relay valve 92 is further provided with a control port 96 which is connected as will be described hereinafter.

The handle 98 of a push-pull parking control valve 100 is mounted in the vehicle operator's compartment and is movable from a normal or running position in which the supply port 102 of the valve 100 is connected to the delivery port 104 of the latter of a parking position in which communication between supply port 102 and the delivery port 104 is terminated and the delivery port 104 is vented to the exhaust port 106. As illustrated in FIG. 1, the supply port 102 is communicated directly to the parking-emergency reservoir 20 and the delivery port 104 is communicated both to the control port 64 of the limiting valve 58 and is also communicated through a conventional double check valve 108 to the lock ports 84 and 86 of the actuators 76 and 78. The double check valve 108 assures that fluid pressure will be communicated to lock ports 84 and 86 if a service actuation is effected.

The valving enclosed within the dashed lines generally indicated by the numeral 110 in FIG. 1 is shown in detail in FIG. 2. the valving 110 includes three valve mechanisms 112, 114, and 116, which are substantially identical with each other. Referring to the valve mechanism 116, a valve housing 118 is provided with a supply port 120, a delivery port 122, and a control port 124. A valve seat 126 is located within the housing 118 between the supply port 120 and the delivery port 122 and is adapted to cooperate with a valve element 128 which is slidably mounted within the housing 118 between the supply port 120 and the valve seat 126. A fluid pressure responsive piston 130 defines a fluid pressure responsive area 132 which is exposed to the pressure level at the control port 124. A spring 134 yieldably urges the piston 130 against the opposition of the fluid pressure source acting on the area 132, to the position illustrated in the drawing wherein the end 136 of the piston 130 sealingly engages the valve element 128. The length of the piston 130 is such that, when the spring 134 urges the piston 130 to the position illustrated in the drawing, that the valve element 128 is urged away from the valve seat 126, thereby permitting substantially uninhibited fluid communication between the supply port 120 and the delivery port 122. The piston 130 is further provided with a passage 138 therewithin which communicates with an exhaust port 140. Clearly, when the piston 130 is disposed in the position illustrated in the drawing, the end 136 of the piston 130 is sealingly engaged with the valve seat 128, thereby preventing communication through the passage 138 to the exhaust port 140. However, when the pressure at the control port 124 exceeds the force exerted by the spring 134 thereby urging the piston 130 to the left viewing FIG. 2, the valve element 128 will engage the valve seat 126, thereby terminating communication between the supply port 120 and delivery port 122, and initiating communication between the delivery port 122 and the exhaust port 140, thereby exhausting the fluid pressure level at the delivery port 122. The valves 112 and 114 are identical to the valve 116, except that the control port 124 is eliminated, and a passage 142 is drilled in the housing 118 to communicate the corresponding supply port with the fluid pressure responsive face of the corresponding pistons. Therefore, elements of valves 112 and 114 which are substantially the same as corresponding elements of the valve 116 retaining the same reference character subscripted by the letters a and b, respectively. Consequently, the valves 112, 114 permit substantially uninhibited fluid communication between the supply ports $120_a$, $120_b$ and delivery ports $122_a$, $122_b$ thereof until the pressure level at their supply ports $120_a$, $120_b$ reaches some predetermined pressure level sufficient to overcome the force of the springs $134_a$, $134_b$ thereby causing the valves 112 and 114 to close communication between their corresponding supply and delivery ports and to exhaust the pressure level at their corresponding delivery ports.

The delivery port $122_b$ of valve 114 is connected to the control port 96 of the relay valve 92 through the double check valve 144. The control port 96 of relay valve 92 is also connected to a delivery port of a standby valve 146 through the double check valve 144. The standby valve 146 is identical to the valve 116 described hereinabove, and corresponding elements of the valve 146 are assigned the same reference numerals as are equivalent elements in the valve 116 subscripted with the letter c. The supply port $120_c$ of standby valve 146 is connected to the delivery port 38 of the brake valve 32. The control port $124_c$ of standby valve 146 is connected to the primary reservoir 16. Therefore, as long as the pressure level in primary reservoir 16 remains above the predetermined level, communication between the supply port $120_c$ and delivery $122_c$ will be prevented. However, when the pressure level in the primary service reservoir 16 drops below the predetermined level, communication between the suppply port $120_c$ and delivery port $122_c$ is permitted. Therefore, when a service brake application is effected by operation of the brake valve 32 to communicate the inlet port 30 with the delivery port 38, fluid pressure will also be communicated to the control port 96 of the relay valve 92 through the standby valve 146 and the double check valve 144.

MODE OF OPERATION

During normal running operation of the vehicle, the push-pull valve 100 permits communication between the supply port 102 and delivery port 104 thereof thereby communicating fluid pressure from the parking-emergency reservoir 20 to the control port 64 of the limiting valve 58 and to the lock ports 84, 86 of the brake actuators 76 and 78. Therefore, when a brake application is effected by operation of the dual brake valve 32, fluid pressure is communicated through the brake valve 32 from the primary reservoir 16 to the service ports 72 and 74 of the brake actuators 76 and 78 through the double check valve 54, the limiting valve 58 and the relay valve 62. Since a relatively high pressure level is communicated to the control port 64 of the limiting valve 58, the latter permits substantially uninhibited fluid communication therethrough to actuate the relay valve 62. Of course, operation of the brake valve 32 also communicates fluid pressure from the secondary reservoir 18 to the front brake actuators 50 and 52 in the normal manner. Since the control port $124_c$ of standby valve 146 is communicated to the relatively high pressure in the primary service reservoir 16, communication between the supply port $120_c$ and delivery port $122_c$ of the standby valve 146 is prevented. However, if because of a malfunction in the braking system, the pressure level in the primary service reservoir 16 drops below a predetermined level thereby preventing communication to the service ports 72 and 74 of brake actuators 76 and 78 upon operation of brake valve 32, the pressure level at control port $124_c$ of standby valve 146 will also be exhausted, thereby causing the latter to initiate communication between the supply and the delivery ports $120_c$ and $122_c$. Therefore, upon operation of the brake valve 32 to effect a brake application, pressure from the secondary reservoir 18 not only is used to actuate the front wheel brake actuators 50 and 52, but is also communicated through the standby valve 146 and double check valve 144 to the control port 96 of the relay valve 92. The fluid pressure level at the control port 96 actuates the relay valve 92 to initiate communication between the fluid pressure content of the emergency-parking reservoir 20 and the emergency-parking ports 80 and 82 of the brake actuators 76 and 78. The pressure level communicated to the ports 80 and 82 is effective to actuate the brake actuators 76 and 78 to make the brake application. Of course, when fluid pressure is available to the lock ports 84 and 86, upon release of the brake valve 32, the brakes of the vehicle will be released in the normal manner.

When the vehicle is parked, the valve 100 is moved to the parking position, thereby terminating communication from the supply port 102 to the delivery port 104, and exhausting the fluid pressure level in the lines downstream of the valve 100. Therefore, the fluid pressure level is exhausted from the locking ports 84 and 86 of the brake actuators 76 and 78 and also from the control port 64 of the limiting valve 58. However, venting of the lock ports 84 and 86 only sets the locking mechanism within the actuators 76 and 78 to prevent movement of the actuating rods in the brake release direction. In order to "lock on" a brake application, a brake application must first be effected after the pressure level at the lock ports 84, 86 is vented. Similarly, when charging of the lock ports 84 and 86, when the vehicle is to be moved, only releases the locking mechanism, and in order to release the parking application, a brake application of a predetermined magnitude must also be effected. The valving mechanism enclosed within the dashed lines indicated by the numeral 110 is effective to automatically communicate and release a predetermined fluid pressure level to the emergency-parking ports 80 and 82 when the vehicle is parked and communicates and releases a predetermined pressure level to the service ports 72 and 74 of the brake actuators 76 and 78 upon release of parking mechanism. Referring now to the FIG. 2, when the valve 100 is moved to the parking position, thereby exhausting the fluid pressure level in the brake line downstream of the valve, the pressure level at control port 124 of valve 116 is exhausted, thereby permitting spring 134 to urge the piston 130 to the position illustrated in the drawings. In this position, the valve element 128 is moved away from the valve seat 126, thereby permitting substantially uninhibited fluid communication from the fluid pressure stored in the emergency-parking reservoir 20 to the delivery port 122 of the valve 16. Delivery port 122 of valve 116 is communicated directly to the supply port $120_6$ of the valve 114. When the valve is in the position illustrated in the drawing, substantially uninhibited fluid communication is permitted therethrough between the ports $120_b$ and $122_b$ and therefore, to the control port 96 of relay valve 92 through the double check valve 144. Fluid pressure communicated to control port 96 of the relay valve 92 initiates fluid communication between the supply port 94 and delivery ports 88, 90 of the relay valve 92, thereby communicating the fluid pressure level stored in emergency-parking reservoir 20 to the emergency-parking ports 80 and 82 of the brake actuators 76 and 78. Since the pressure level at the lock ports 84 and 86 has already been exhausted, this automatically applied emergency-parking application assures that a brake application will be "locked on" when the vehicle is parked. As discussed hereinabove, the supply port $120_b$ of the valve 114 is communicated through passage $142_b$ to the face $132_b$ of the piston $130_b$. When a predetermined pressure level is established at the supply port $120_b$ and therefore, on face $132_b$ of piston 130, the force of the spring $134_b$ is overcome, thereby permitting the piston $130_b$ to move upwardly viewing FIG. 2, thereby permitting the valve element $128_b$ to close against valve seat $126_b$ to terminate communication between the supply port $120_b$ and the delivery port $122_b$ of the valve 114. At the same time, of course, the end $136_b$ of the piston $130_b$ moves away from the valve element $128_b$, thereby exhausting fluid pressure level at the delivery port $122_b$ to atmosphere through exhaust port $140_b$. Therefore, the valves 114 and 116 are effective upon movement of the valve 110 to the parking position to automatically apply a predetermined pressure level to the emergency-parking ports 80 and 82 and then to automatically release this pressure.

If a full service actuation is effected at the time that the parking brakes are applied, additional forces would be applied to the brake actuating mechanisms which may result in damaging the mechanisms or increasing the effective parking application, thereby preventing release. For this reason, limiting valve 58 has been provided to limit the service brake application upon operation of the parking valve 100. As described hereinabove, movement of the valve 100 to the parking position exhausts the control port 64 of the limiting valve 58, so that the fluid pressure level at the delivery port 60 of the latter is only approximately one-half of the fluid pressure level at the inlet port 56. Therefore, the service brake application is limited to a low level which, even in conjunction with the emergency-parking application, is in sufficient to damage the braking mechanisms or prevent release of the "locked on" parking application.

When the vehicle is to be moved, the valve 100 is moved to the normal running condition, thereby again initiating fluid communication between the supply and delivery ports 102 and 104 to charge the lines downstream of the valve 100 with the fluid pressure content of the reservoir 20. When this occurs, fluid pressure is again communicated to the control port 124 of the valve 116, thereby again permitting the valve member 128 to engage the valve seat 126 to vent the delivery port 122, thereby assuring that the valve 114 is reset into the normal running condition illustrated in FIG. 2. At the same time, or course, fluid pressure is also communicated to the lock ports 84 and 86 to release the locking mechanism. However, in order to release the parking brakes, a brake application of a predetermined magnitude must be made and released. This application is automatically made and released by the valve mechanism generally indicated by the numeral 112. When the vehicle is parked, the spring $134_a$ urges the piston $130_a$ into the position illustrated in the drawing wherein the valve member $128_a$ is urged away from the valve seat 126ₐ. Therefore, when the valve 100 is moved to the normal running position to charge the lines downstream of the valve, fluid pressure is communicated to the supply port 120$_a$ of the valve 112, which is connected to the delivery port 104 of the valve 100 through the double check valve 108. Fluid pressure at the port 120$_a$, since the valve member 128$_a$ is urged away from the valve seat 126$_a$, communicates directly to the delivery port 122$_a$ of the valve 112, and then through the double check valve 54 to the supply port 56 of the limiting valve 58, to thereby effect a brake application by operation of the relay valve 62. When the fluid pressure level at the supply port 120$_a$ increases to a predetermined level, the piston 130$_a$ will be urged upwardly against the bias of the spring 134$_a$, since the passage 142$_a$ communicates the pressure level at the delivery port 120$_a$ to the face 132$_a$ of piston 130$_a$. When this occurs, the valve seat 128$_a$ again engages the valve seat 126$_a$ to terminate communication between the supply port 120$_a$ and delivery port 122$_a$, and to exhaust the pressure level at delivery port 122$_a$ through the passage 138$_a$ of the piston 130$_a$. A service brake application can be made at any time by operation of the brake valve 32, since the double check valve 54 prevents communication between the delivery port of the brake valve and the delivery port of the valve 112.

I claim:

1. In a vehicle fluid pressure braking system having first and second service braking systems and a parking braking system, a first set of brake actuators connected in said first service braking system and a second set of actuators connected in said second service system, brake valve means for communicating fluid pressure in said first and second service braking systems when a brake actuation is effected, said first set of brake actuators including emergency actuation means for actuating said first set of brake actuators upon failure of said first service braking system, said emergency actuation means including emergency valve means having a control port communicated in said first service braking system, an inlet port communicated through said brake valve means to said second service braking system so that upon actuation of said brake valve means fluid communication to said inlet port from said second service braking system is permitted, and an outlet port for communicating fluid pressure to actuate said emergency actuation means, said emergency valve means being responsive to failure of the fluid pressure level at the control port to permit communication between the inlet and outlet ports.

2. The invention of claim 1:
said parking system including valve mechanism for controlling communication therethrough;
said valve mechanism being shiftable between a vehicle operating position and a vehicle parking position, and release valve means responsive solely to shifting of said valve mechanism from said vehicle parking position to said vehicle operating position to communicate fluid pressure to said emergency actuation means until a predetermined pressure level is attained at said service port whereupon said release valve means vents said emergency actuation means.

3. The invention of claim 2:
said brake actuator including fluid pressure controlled locking mechanism communicated to a locking port for locking said actuator in a brake-applied condition, said parking system including valve mechanism for controlling communication therethrough, said valve mechanism being shiftable between a vehicle operating position and vehicle parking position and parking valve means responsive to movement of said valve mechanism from said operating position to said parking position to vent the fluid pressure level communicated to said locking port and communicating fluid pressure to said emergency port.

4. In a vehicle fluid pressure braking system, a brake actuator having a service port connected to a fluid pressure source when a service brake application is effected and fluid pressure responsive parking means for holding the actuator in a brake-applied condition when a parking application is effected, and limiting valve means limiting fluid pressure communication to said service port upon actuation of said parking means, said limiting valve means being responsive to fluid pressure communication to said parking means to permit substantially uninhibited fluid communication to said service port when the parking means is released and to limit communication to said service port when the parking means is actuated, said limiting valve means including an inlet port communicated to said fluid pressure source, an outlet port controlling communication to said service port, and a control port, said limiting valve means being responsive to the fluid pressure level at said control port to establish a fluid pressure level at the outlet port less than the fluid pressure level at the inlet port.

5. The invention of claim 4; and
a parking system for controlling said parking means, said parking system including valve mechanism for controlling communication to said parking means, said control port being communicated to said valve mechanism.

6. The invention of claim 5:
said brake actuator having an emergency port communicated to said parking system, and fluid pressure controlled locking mechanism including a locking port communicated to said parking system for locking said actuator in a brake-applied position when a parking application is effected, said valve mechanism controlling communication to said locking and emergency ports.

7. The invention of claim 6:
said valve mechanism being shiftable between a vehicle operating position and a vehicle parking position, and release valve means responsive solely to shifting of said valve mechanism from said vehicle parking position to said vehicle operating position to communicate fluid pressure to said service port until a predetermined pressure level is attained at said service port whereupon said release valve means vents said service port.

8. The invention of claim 6:
said valve mechanism being shiftable between a vehicle operating position and a vehicle parking position, and parking valve means responsive to movement of said valve mechanism from said operating position to said parking position to vent the fluid pressure level communicated to said locking port and communicating fluid pressure to said emergency port.

9. The invention of claim 8; and
release valve means responsive to shifting of said valve mechanism from said vehicle parking position to said vehicle operating position to communicate fluid pressure to said service port until a predetermined pressure level is attained at said service port whereupon said release valve means vents said service port.

10. The invention of claim 9:
said fluid pressure braking system including a first service braking system communicating said source to said service port and a second service braking system separate from said first service braking system, brake valve means for simultaneously controlling communication through said service braking systems, and emergency valve means having a control port communicated in said first service braking system, an inlet port communicated through said brake valve means to said second service braking system so that upon actuation of said brake valve means fluid communication to said inlet port from said second service braking system is permitted, and an outlet port for communicating fluid pressure to said emergency port, said emergency valve means being responsive to failure of the fluid pressure level at the control port to permit communication between the inlet and outlet ports thereof.

11. The invention of claim 6:
said fluid pressure braking system including a first service braking system communicating said source to said service port and a second service braking system separate from said first service braking system, brake valve means for simultaneously controlling communication through said service braking systems, and emergency valve means having a control port communicated in said first service braking system, an inlet port communicated through said brake valve means to said second service braking system so that upon actuation of said brake valve means fluid communication to said inlet port from said second service braking system is permitted, and an outlet port for communicating fluid pressure to said emergency port, said emergency valve means being responsive to failure of the fluid pressure level at the control port to permit communication between the inlet and outlet port.

* * * * *